United States Patent [19]

Lenzi

[11] Patent Number: 5,702,171
[45] Date of Patent: Dec. 30, 1997

[54] DEVICE FOR ILLUMINATING A SET OF EQUIPMENT ITEMS WHICH ARE MOUNTED ON A COMMON SUPPORT

[75] Inventor: Serge Claude Lenzi, Marseilles, France

[73] Assignee: Eurocopter France, Marseille-Provence, France

[21] Appl. No.: 571,240

[22] Filed: Dec. 12, 1995

[30] Foreign Application Priority Data

Dec. 12, 1994 [FR] France .................. 94 14908

[51] Int. Cl.$^6$ ............................................ G01D 11/28
[52] U.S. Cl. .................................... 362/29; 362/84
[58] Field of Search ........................ 362/29, 30, 84; 116/DIG. 35, DIG. 36

[56] References Cited

U.S. PATENT DOCUMENTS

| | | | |
|---|---|---|---|
| 2,908,806 | 10/1959 | Cohen | 362/84 |
| 3,114,854 | 12/1963 | Koury | 362/29 |
| 3,622,773 | 11/1971 | Schuster . | |
| 4,138,620 | 2/1979 | Dickson | 362/84 |
| 4,181,925 | 1/1980 | Burrows . | |
| 4,559,582 | 12/1985 | Scardilli et al. | 362/30 |

FOREIGN PATENT DOCUMENTS 0 547 943 A1   6/1993   European Pat. Off. .

*Primary Examiner*—Ira S. Lazarus
*Assistant Examiner*—Sara Sachie Raab
*Attorney, Agent, or Firm*—Fisher, Christen & Sabol

[57] ABSTRACT

Device for illuminating a set (1) of equipment items (3), such as indicators or dials of measurement apparatus (4), which are mounted on an outer face (2E) of a common support (2).

According to the invention, this device includes:
- an electroluminescent plate (5), arranged in such a way that its illuminating face (5I) is opposite said outer face (2E) of said common support (2), spaced away from said outer face, and provided with a plurality of apertures (7);
- a facing (8) arranged on the non-illuminating face (5E) of said electroluminescent plate (5), and also provided with a plurality of apertures (9); and
- electrical power supply means (6) for said electroluminescent plate (5).

Illumination of instrument panels, particularly for aircraft.

13 Claims, 3 Drawing Sheets though not exclusively, it is particularly appropriate for being used for illumination of instrument panels of industrial or laboratory installations, of land, sea or airborne vehicles, etc., grouping together instruments in a control or piloting position.

DEVICE FOR ILLUMINATING A SET OF EQUIPMENT ITEMS WHICH ARE MOUNTED ON A COMMON SUPPORT

The present invention relates to a device for illuminating a set of equipment items, such as dials or indicators of measurement apparatus, which are mounted on an outer face of a common support. Although not exclusively, it is particularly appropriate for being used for illumination of instrument panels of industrial or laboratory installations, of land, sea or airborne vehicles, etc., grouping together instruments in a control or piloting position.

The invention moreover relates to such a set of equipment items, or instrument panel, capable of being illuminated by said device.

Numerous devices are already known for illuminating instrument panels. They take the form, essentially:

- of integrated illumination devices, in which each equipment item possesses its own illumination, consisting of lamps or of light-emitting diodes, for example. Such devices require numerous electrical links. They are therefore heavy, expensive, difficult to maintain and they make it possible only with difficulty to avoid spurious illumination of the eye of an observer, which leads to mediocre illumination contrast. Moreover, they can possibly generate spurious heat;
- indirect-illumination devices, including projectors or illumination booms (lamps, light-emitting gas tubes) arranged at a distance from the equipment items to be illuminated and turned toward them. These devices exhibit substantially the same drawbacks as those mentioned in connection with integrated illumination devices, except that the electrical links are less numerous. However, because the illumination of the equipment items by projectors and booms is collective, non-useful parts of the instrument panels are illuminated as a result (which is unfavorable to the contrast), while certain shadow regions appear (which impairs the uniformity of the illumination and tires the observer's eyes;
- distributed-illumination devices, including a plurality of individual light sources, mounted between the equipment items and around each of them. It will be understood that the drawbacks mentioned above are encountered again in such devices; and
- devices for illumination by optical fibers, such as that described in the Patent FR-A-2,370,342. They include light diffusers arranged around the equipment items to be illuminated, supplied from optical fibers and illuminating said equipment items with glancing light. These devices make it possible to dispense with the wiring and the electrical equipment items on the instruments and monitoring or control panels, and to centralize the illumination source. This results in an improvement in reliability, great ease of maintenance, good protection of this source, good temperature behavior, simplification in manufacture, of assembly and of maintenance, a saving in weight, a reduced bulk and a low cost price. However, they do not make it possible to avoid the illumination of unusable parts of the instrument panels and the formation of shadow regions.

The subject of the present invention is a device for illuminating instrument panels or the like, making it possible to remedy the drawbacks, recalled above, of the known devices and, moreover:

- to illuminate only the useful parts of said instrument panels, without illuminating the structure surrounding the equipment items, so that the contrast is excellent, which optimizes the legibility of said equipment items;
- to avoid shadow regions on said instrument panels and to illuminate them uniformly;
- to avoid, or at least to minimize, reflections generated by accidentally illuminated elements;
- to adapt itself easily to the configuration of the instrument panels, whatever their configuration and the arrangement and the number of the instruments which they include; and
- not to disturb the use of night-vision goggles.

To this end, according to the invention, the device for illuminating a set of equipment items, such as indicators or dials of measurement apparatus, which are mounted on an outer face of a common support, is note-worthy in that it includes:

- an electroluminescent plate, arranged in such a way that its illuminating face is opposite said outer face of said common support, said electroluminescent plate occupying a fixed position, spaced away from said outer face, and being provided with a plurality of apertures, the arrangement and the dimensions of which correspond respectively to the arrangement and to the dimensions of said equipment items on said common support, so that each of them is opposite an aperture of appropriate dimensions of said electroluminescent plate;
- a facing, arranged on the non-illuminating face of said electroluminescent plate, opposite said outer face of said common support, and also provided with a plurality of apertures, the arrangement and the dimensions of which are similar to the arrangement and to the dimensions of the apertures of said electroluminescent plate; and
- electrical power supply means for said electroluminescent plate.

Thus, each equipment item is illuminated by the light which it receives from said electroluminescent plate and which it reflects through the superimposed apertures of said electroluminescent plate and of said facing. All the equipment items are thus illuminated identically and only said equipment items are seen illuminated. This results in good uniformity of illumination and excellent contrast with respect to the background surrounding said equipment items.

For preference, said power supply means deliver an alternating voltage of a few tens to a few hundreds of volts having a frequency of a few tens to a few hundreds of Hertz.

According to a first embodiment, said electroluminescent plate consists only of a single electroluminescent panel which, as is known, is formed by an electrically excitable dielectric sheet arranged between a metal plate forming an electrode and a plate of conducting glass. In a variant, said electroluminescent plate may consist of at least two such electroluminescent panels, imbricated into one another in such a way that each of them can illuminate said equipment items. In this case, it is advantageous for the periphery of each of said apertures of the electroluminescent plate to consist of consecutive portions belonging to different electroluminescent panels.

Clearly, it is possible to envisage making said illumination device operate by simultaneously supplying power to all the electroluminescent panels. However, at least one of the panels may serve as backup and be supplied with power only when the other panel or panels suffer a breakdown.

In one advantageous practical embodiment, said electroluminescent plate consists of two imbricated electroluminescent panels, such that the peripheral portion of each aperture of said plate belonging to one of said panels (the panel corresponding to normal operation) is larger than the peripheral portion of said aperture belonging to the other of said panels (the backup panel).

Thus it is possible to obtain satisfactory illumination in normal operation, while taking advantage of backup illumination, which is weaker but sufficient.

The present invention also relates to a set of equipment items, such as indicators or dials of measurement apparatus, which are mounted on an outer face of a common support, said assembly being noteworthy in that it includes:

an electroluminescent plate, arranged in such a way that its illuminating face is opposite said outer face of said common support, said electroluminescent plate occupying a fixed position, spaced away from said outer face, and being provided with a plurality of apertures, the arrangement and the dimensions of which correspond respectively to the arrangement and to the dimensions of said equipment items on said common support, so that each of them is opposite an aperture of appropriate dimensions of said electroluminescent plate; and a facing, arranged on the non-illuminating face of said electroluminescent plate, opposite said outer face of said common support, and also provided with a plurality of apertures, the arrangement and the dimensions of which are similar to the arrangement and to the dimensions of the apertures of said electroluminescent plate.

Advantageously, in order to avoid difficulties in viewing the equipment items due to parallax, the spacing between the outer face of said common support and said electroluminescent plate is of a few millimeters.

This spacing can be fixed by spacers arranged between said common support and said electroluminescent plate. Such spacers may be combined with means of fixing said electroluminescent plate and said facing onto said common support.

The apertures in said electroluminescent plate may, particularly for mass production, be produced by reserving them in said plate when it is manufactured, without the need for piercing said plate.

However, in a variant, said apertures of said electroluminescent plate, as well, moreover, as those of said facing, can be obtained by cutting-out in said plate or in said facing. The cutting-out of said apertures may possibly be done in a single operation, if the electroluminescent plate and the facing are superimposed beforehand.

It results therefrom that said illumination device in accordance with the present invention can easily be adapted to all configurations and dimensions of equipment items, both in mass production and in one-off manufacture, for example personalized manufacture. This illumination device can even be mounted on already existing instrument panels.

Although this is not indispensable for certain types of electroluminescent panels, after cutting-out of the apertures in said electroluminescent plate, it is advantageous for the edges of the apertures cut out in the electroluminescent plate to be electrically insulated.

To this end, the electrical insulation of the edges of the apertures of the electroluminescent plate can be obtained by the use of transparent plastic films covering the two faces of said electroluminescent plate and welded together in said apertures, along said edges.

In a variant, provision can be made for each aperture in said facing to be smaller than the associated aperture of said electroluminescent plate, in such a way as to form peripheral shoulders around the edges of the apertures of said electroluminescent plate, and the electrical insulation of said edges may then be obtained by peripheral rings of insulating material, resting on said shoulders.

The figures of the attached drawing will give a good understanding of how the invention can be produced. In these figures, identical references designate similar elements.

FIG. 1 diagrammatically shows a front view of a part of an instrument panel, for example of an aircraft.

Figure 2:
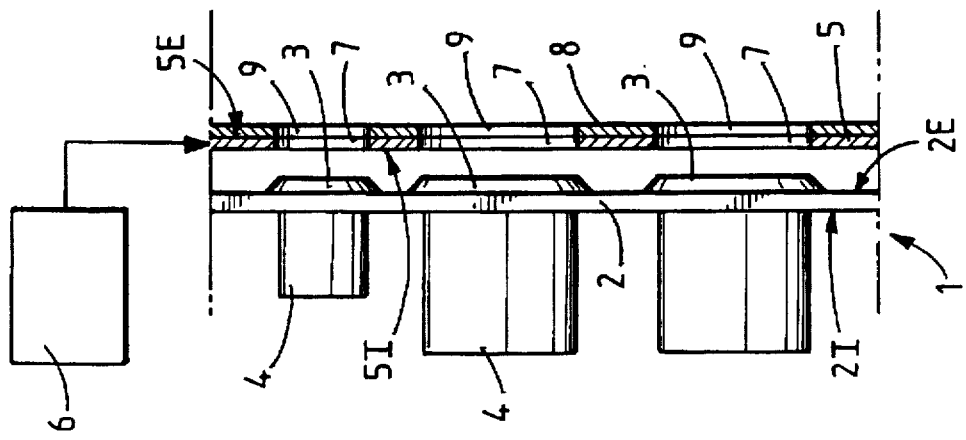
FIG. 2 is a section along the line II—II of FIG. 1, illustrating a first embodiment with a single electroluminescent panel.
Figure 1:
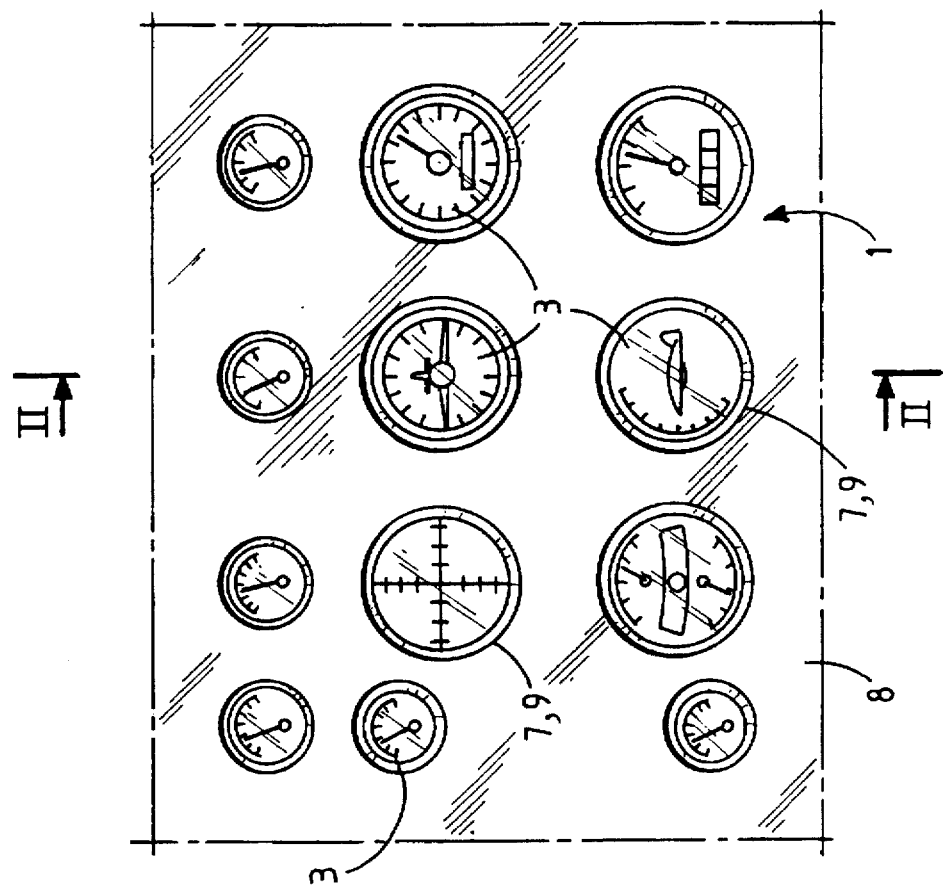

The instrument panel 1, in accordance with the present invention and partially and diagrammatically represented in FIGS. 1 and 2, includes a support 2, for example a panel, on which equipment items 3, for example dials of a plurality of measurement apparatuses 4, are mounted in common. The dimensions of the display members 3 may be varied, and all said display members 3 appear on the same outer face 2E of the support 2. The measurement apparatuses 4 may be fixed to the inner face 2I of the support 2.

Facing the outer face 2E of the support 2, an electroluminescent plate 5 is arranged, which is capable of being fed with electric current at medium frequency by an electrical power supply 6, the illuminating inner face 5I of said electroluminescent plate 5 being turned towards said outer face 2E of said support 2. The electroluminescent plate 5 occupies a position which is fixed with respect to said support 2 and it is spaced away from said outer face 2E by a distance d (see FIG. 3). Said electroluminescent plate 5 is pierced by a plurality of apertures 7, the arrangement and the dimensions of which correspond respectively to the arrangement and to the dimensions of said equipment items 3, so that each of them is opposite an aperture 7 of substantially equal dimensions.

The outer, nonilluminating, face 5E of said electroluminescent plate 5, opposite the outer face 2E of the support 2, carries a facing 8, pierced by a plurality of apertures 9 the arrangement and the dimensions of which are similar to the arrangement and to the dimensions of the apertures 7 of the electroluminescent plate 5 and of the equipment items 3.

Thus each of said equipment items 3 is visible through a pair of corresponding superimposed apertures 7 and 9.

Figure 3:
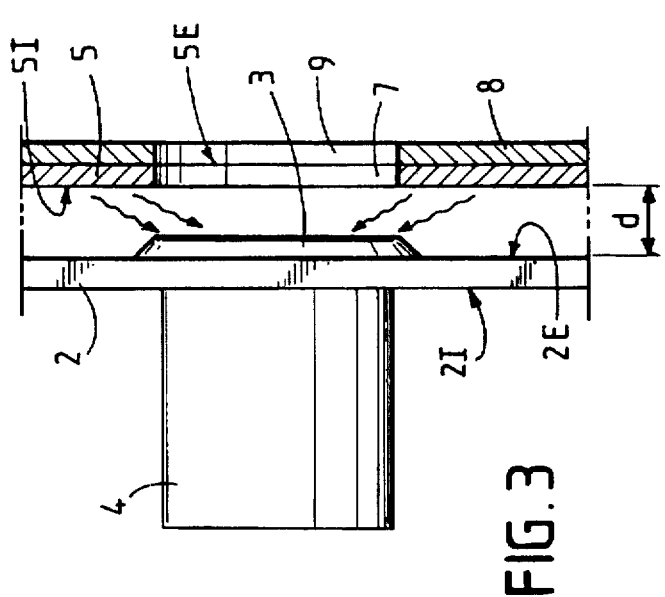
FIG. 3 is an enlarged view of a part of the section of FIG. 2.

In FIGS. 2 and 3, it has been assumed that said electroluminescent plate 5 consisted only of a single electroluminescent panel.

It is known that electroluminescent panels, such as the panel constituting the plate 5, generally consist of a dielectric sheet which contains an electrically excitable product and which is arranged between a metal plate forming an electrode (non-illuminating face 5E) and a plate of a special conducting glass (illuminating face 5I). This structure is well known, so that it is not represented in detail in the drawings, on which said electroluminescent panel is mounted as if it were uniform.

For preference, for the implementation of the present invention, electroluminescent panels which are commercially available under the name COMTRONIC are used.

When the electrical power supply 6 establishes a current at medium frequency between said metal plate and said glass plate, said dielectric sheet illuminates and light is emitted through said glass plate. The power supply voltage, generated by the electrical power supply 6, and the frequency of this voltage have an influence on the brightness of the electroluminescent panel of the plate 5. Consequently, the power supply voltage and its frequency can be used as parameters for adjusting the illuminating of the equipment items 3. By virtue of these parameters, it is possible to adjust the illumination to the appropriate value without having to add top-up illumination, glass fibers, etc. to a basic illumination determined by a preliminary study, as is the case for the prior art.

Clearly, when the electroluminescent plate 5 is supplied with power, the whole of the outer face 2E of the support 2 is illuminated practically uniformly. However, since the electroluminescent plate 5 includes an opaque metal plate and since the facing 8 is itself generally opaque, an observer looking at the instrument panel 1 can see, of the light emitted by said electroluminescent plate 5, only that which is reflected by the equipment items 3 and which passes through the pairs of superimposed apertures 7 and 9. It will be noted that the light reflected by an equipment item 3 results from rays which are inclined with respect to the face 2E (symbolized by wavy arrows in FIG. 3) and originating from the periphery of the aperture 7 located opposite said equipment item 3.

Due to the fact that the electroluminescent plate 5 is spaced by a distance d away from the support 2, it is necessary to adjust this distance d, depending on the dimensions of each equipment item 3 and on the dimensions of the associated apertures 7 and 9, so that, for an observer offset laterally with respect to said equipment item, there is no resultant loss of light, nor masking of peripheral areas of said equipment item, both due to parallax.

By way of example, if the equipment item 3 is a circular dial having a diameter of 80 mm, a spacing d lying between 2 and 5 mm allows satisfactory illumination of said equipment item without generating parallax problems.

Figure 4:
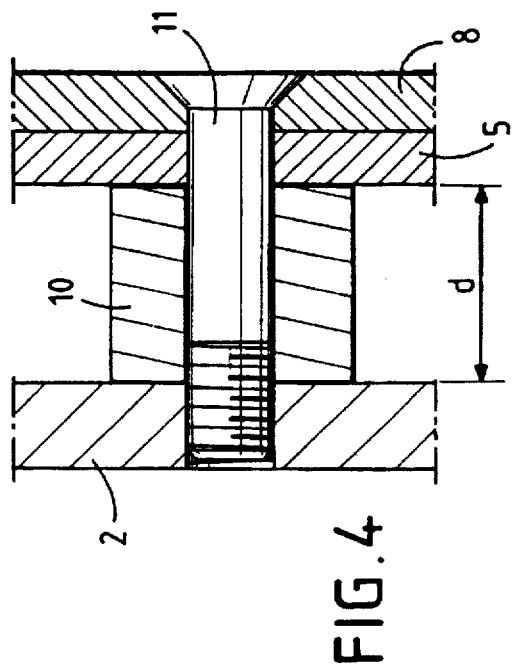
FIG. 4 illustrates the fixing of the electroluminescent plate and of the facing onto the common support.

As FIG. 4 shows diagrammatically, the spacing d can be provided by spacers 10, arranged between the common support 2, on the one hand, and the electroluminescent plate 5 and the facing 8, on the other hand. The spacers 10 can be traversed by screws 11 or the like, providing the fixing of said electroluminescent plate 5 and of said facing 8 onto said support 2.

Thus it is seen that the electroluminescent plate 5 and the facing 8 can easily be mounted on the support 2, or dismantled therefrom, while, upon each reassembly, preserving the appropriate distance d. The dismantling of the electroluminescent plate 5 and of the facing 8 from the support 2 then allows access to the equipment items 3, for the purpose of maintenance thereof, for example.

Figure 5:
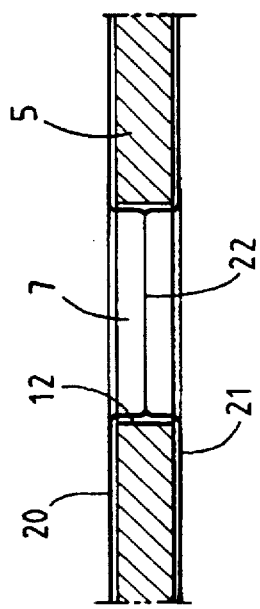

In order to form the apertures 7 and 9, it is optionally possible (see above) to carry out cutting-out of the electroluminescent plate 5 and of the facing 8. If apertures 7 and 9 are identical each time (see FIG. 5), the plate 5 and the facing 8 can be superimposed and even secured together before cutting-out, in order to require only a single cutting-out operation. The edges 12 of the apertures 7 can then be electrically insulated by the use of transparent plastic films 20, 21 covering the two faces of the electroluminescent plate 5 and welded together, at 22, in said apertures 7, along said edges 12 (see FIG. 5).

Figure 6:
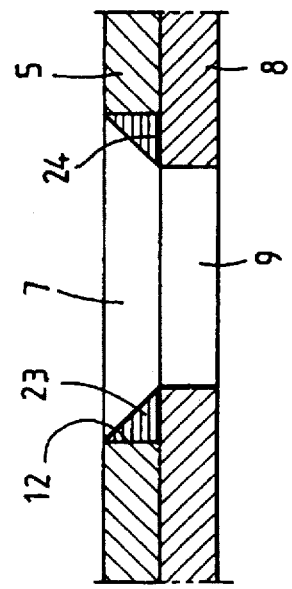
FIGS. 5 and 6 show two variant embodiments of the electrical insulation of the edges of the apertures pierced in said electroluminescent plate.

If, as is represented in FIG. 6, the apertures 9 are smaller than the associated apertures 7, it is quite clear that two separate cutting-out operations are necessary. However, in this case, the electrical insulation of the edges 12 can be achieved by peripheral rings 23, of insulating material, bearing on the peripheral shoulders 24 formed between the associated apertures 7 and 9, due to the difference in dimensions.

Figure 7:
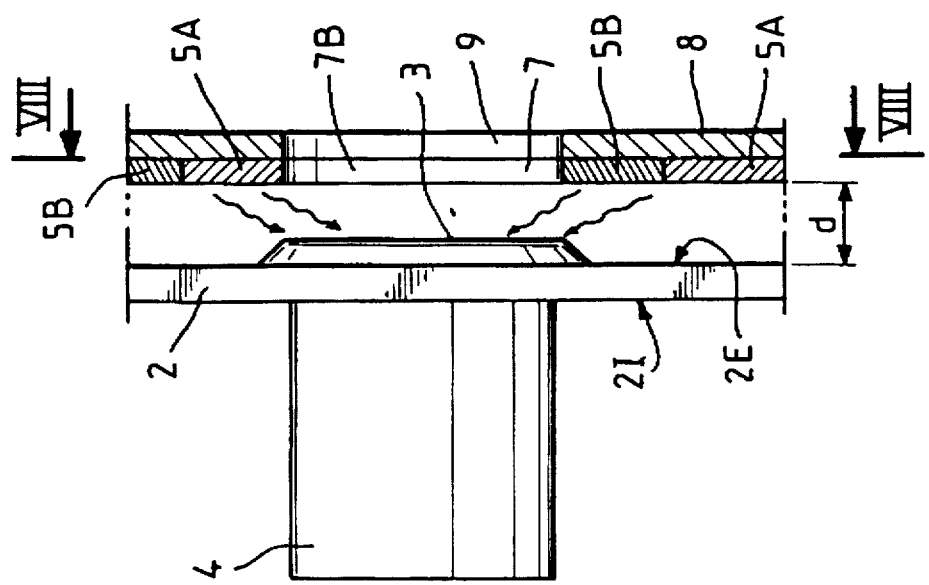
FIGS. 7 and 8 are two views, respectively along the lines VII—VII and VIII—VIII of a variant embodiment in which the electroluminescent plate is formed by two imbricated electroluminescent panels.
Figure 8:
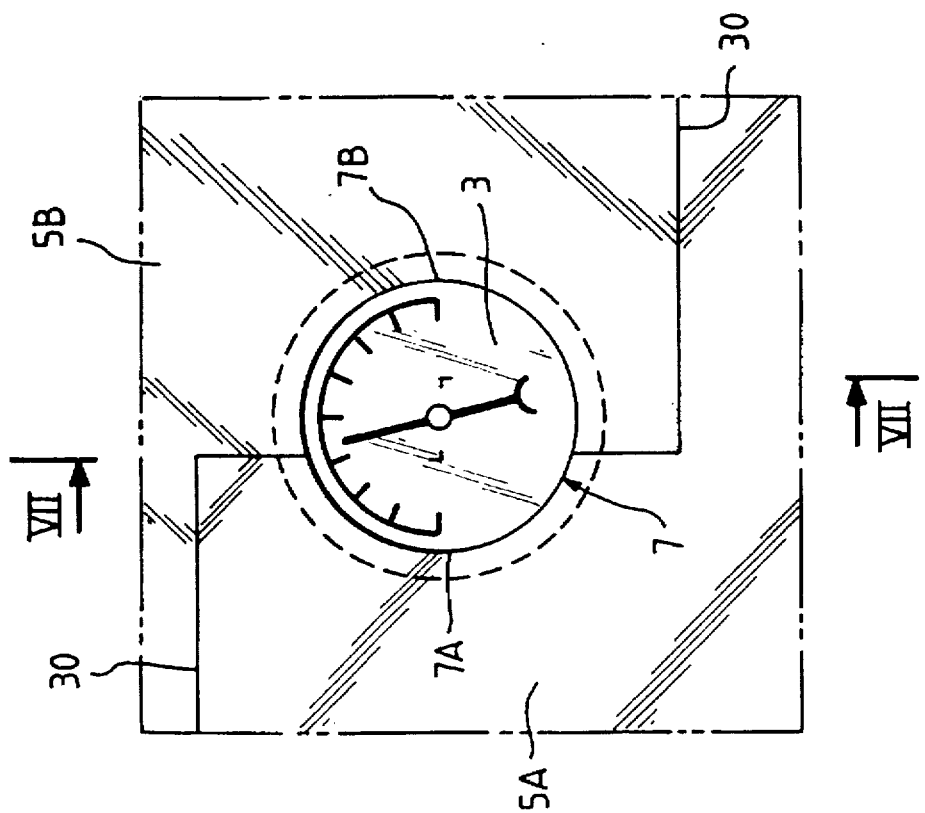

In the variant embodiment of FIGS. 7 and 8 of the illumination device in accordance with the present invention, the electroluminescent plate no longer consists only of a single electroluminescent panel 5, as was described above in connection with FIGS. 2 to 6, but, on the contrary, it consists of two electroluminescent panels 5A and 5B, imbricated in such a way that each of them can illuminate said equipment items 3.

As can be seen, said electroluminescent panels 5A and 5B are separated from one another by a broken line 30 dividing the periphery of each aperture 7 into two consecutive portions 7A and 7B, belonging respectively to the panel 5A and to the panel 5B. Moreover, the peripheral portions 7A and 7B are not equal, but the portion 7B is longer than the portion 7A.

Thus, the electroluminescent panel 5B can be used for illuminating the equipment items 3 in normal operation, while the electroluminescent panel 5A is used as backup, when the electroluminescent panel 5B suffers a breakdown.

Moreover the electroluminescent panels 5A and 5B can be used simultaneously for illuminating the equipment item 3 in normal operation, and each of said electroluminescent panels 5A or 5B is used as backup, when the other of said electroluminescent panels 5B or 5A suffers a breakdown.

Among the advantages of the illumination device in accordance with the present invention may be mentioned: low mass; uniformity and proportionality of illumination; mechanical flexibility, which makes it possible to follow changes of shape; minimal thickness resistance to vibration; emission of monochromatic light, without sparkling and with low heat dissipation; low energy consumption; lifetime>10,000 hours; brightness variable as a function of the two parameters, voltage and frequency; possibility for choice of color.

I claim:

1. A device for illuminating a set (1) of equipment items (3) which are mounted on an outer face (2E) of a common support (2), which includes:

an electroluminescent plate (5) having an illuminating face and having a non-illuminating face, and being positioned so that said illuminating face (5I) of the electroluminescent plate (5) face said outer face (2E) of said common support (2), said electroluminescent plate occupying a fixed position, spaced away from said outer face, and said electroluminescent plate (5) being provided with a plurality of apertures (7), each of said plurality of apertures (7) having a periphery and each of said equipment items (3) being arranged so that it is aligned with one of said plurality of apertures (7) of said electroluminescent plate (5), each of said plurality of apertures (7) being approximately of equal size as the equipment item (3) to which it is aligned, and said electroluminescent plate (5) consisting of at least two electroluminescent panels (5A, 5B), imbricated so that each of said two electroluminescent panels (5A, 5B) can illuminate said equipment items (3) and wherein the periphery of each of said apertures (7) of said electroluminescent plate consists of consecutive portions (7A, 7B) belonging to said at least two electroluminescent panels (5A, 5B);

a facing (8), arranged on the non-illuminating face (5E) of said electroluminescent plate (5), opposite of said outer face (2E) of said common support (2), and also provided with a plurality of apertures (9), each of said plurality of apertures (9) of said facing (8) being approximately of equal size as the aperture (7) of said electroluminescent plate (5) to which it is adjacent; and electrical power supply means (6) for said electroluminescent plate (5).

2. The illumination device as claimed in claim 1, wherein said power supply means (6) deliver an alternating voltage of at least twenty to at most several hundred volts having a frequency of at least twenty to at most several hundred Hertz.

3. The illumination device as claimed in claim 1, wherein the periphery (7B) of each of said apertures (7) of said electroluminescent plate belonging to one of said imbricated electroluminescent panels is larger than the peripheral portion (7A) of said aperture (7) belonging to another of said imbricated electroluminescent panels (5A).

4. The illumination device as claimed in claim 1, wherein one (5B) of said electroluminescent panels (5A, 5B) is used for illumination of said equipment items (3) in normal operation, while another (5A) of said electroluminescent panels is used as backup, when said electroluminescent panel (5B) for normal illumination suffers a breakdown.

5. The illumination device as claimed in claim 1, wherein said electroluminescent panels (5A, 5B) are used simultaneously for illuminating said equipment items (3) in normal operation and wherein each of said electroluminescent panels (5A or 5B) is used as backup, when another of said electroluminescent panels (5B or 5A) suffers a breakdown.

6. The illumination device as claimed in claim 1, wherein the equipment items are indicators or dials of measurement apparatus (4).

7. A set (1) of equipment items (3) which are mounted on an outer face (2E) of a common support (2), which includes:

an electroluminescent plate (5) having an illuminating face and having a non-illuminating face, and being positioned so that said illuminating face (51) of the electroluminescent plate (5) face said outer face (2E) of said common support (2), said electroluminescent plate occupying a fixed position, spaced away from said outer face, and said electroluminescent plate (5) being provided with a plurality of apertures (7), each of said plurality of apertures (7) having a periphery and each of said equipment items (3) being arranged so that it is aligned with one of said plurality of apertures (7) of said electroluminescent plate (5), each of said plurality of apertures (7) being approximately of equal size as the equipment item (3) to which it is aligned, said apertures (7) of said electroluminescent plate (5) being obtained by cutting-out edges in the electroluminescent plate (5) and wherein the edges (12) of the apertures (7) cut out in said electroluminescent plate (5) are electrically insulated; and a facing (8), arranged on the non-illuminating face (5E) of said electroluminescent plate (5), opposite of said outer face (2E) of said common support (2), and also provided with a plurality of apertures (9), each of said plurality of apertures (9) of said facing (8) being approximately of equal size as the aperture (7) of said electroluminescent plate (5) to which it is adjacent.

8. The set (1) of equipment items (3) as claimed in claim 7, wherein the outer face (2E) of said common support (2) is situated a few millimeters from said electroluminescent plate (5).

9. The set (1) of equipment items (3) as claimed in claim 7, wherein spacers (10) arranged between said common support and said electroluminescent plate fix the distance between the outer face (2E) of said common support (2) and said electroluminescent plate (5).

10. The set (1) of equipment items (3) as claimed in claim 7, wherein said spacers (10) are combined with means of fixing said electroluminescent plate (5) and said facing (8) onto said common support (2).

11. The set (1) of equipment items (3) as claimed in claim 7, wherein electrical insulation of the edges (12) of the apertures (7) of the electroluminescent (5) is obtained by use of transparent plastic films (20, 21) covering two faces of said electroluminescent plate (5) and welded together (at 22) in said aperture (7), along said edges (12).

12. The set (1) of equipment items (3) as claimed in claim 7, wherein each aperture (9) of said facing (8) is smaller than the adjacent aperture (7) of said electroluminescent plate (5), in such a way as to form peripheral shoulders (24) around the edges (22) of said apertures (7), and wherein the electrical insulation of said edges (12) of the apertures (7) of the said electroluminescent plate (5) is obtained by peripheral rings of insulating material (23), resting on said shoulders (24).

13. The illumination device as claimed in claim 7, wherein the equipment items are indicators or dials of measurement apparatus (4).

\* \* \* \* \*